Feb. 16, 1932.  E. K. BAKER  1,845,697

TIE ROD CONSTRUCTION

Filed Aug. 7, 1931

INVENTOR
Eric K. Baker
BY
ATTORNEY

Patented Feb. 16, 1932

1,845,697

UNITED STATES PATENT OFFICE

ERLE K. BAKER, OF CHICAGO, ILLINOIS

TIE ROD CONSTRUCTION

Application filed August 7, 1931. Serial No. 555,714.

This invention relates to improvements in tie rod constructions and it consists of the matters hereinafter described and more particularly pointed out in the appended claims.

The improved construction is more particularly concerned with the connection between the rod itself and the stud by means of which the rod is connected to an associated part of an automobile.

The primary object of the invention is to provide an improved oscillatory mounting for the hemi-spherical head of the stud, within its associated bearing recess carried by the rod and wherein said head is so formed as to have a universal rocking movement near or at its center upon a yieldably supported stud carried by said bearing member, whereby frictional engagement at this point is reduced to a minimum and one member rolls upon the other.

The above mentioned object of the invention as well as others, together with the several advantages thereof, will more fully appear as I proceed with my specification.

In the drawings:—

In general the improved construction includes a sleeve like member fixed to one end of an automobile tie rod or the like and which sleeve is formed at one end with a hollow boss or housing member defining an internal hemi-spherical bearing surface at one end, the other end of the boss being closed by a cap or the like after the several parts have been assembled together. Disposed in the boss or housing member is the head of a stud by which the rod is connected to an associated part of an automobile.

The head is substantially hemi-spherical to engage the bearing surface in the housing member before referred to and is provided at or near its center with a recess having a surface adapted for a universal, rocking bearing engagement upon the head of a button yieldably engaged against said surface and supported from the cap or the like, the said surface and button being so correlated as to cause one surface to roll upon the other and reduce friction to a minimum.

Figure 1:
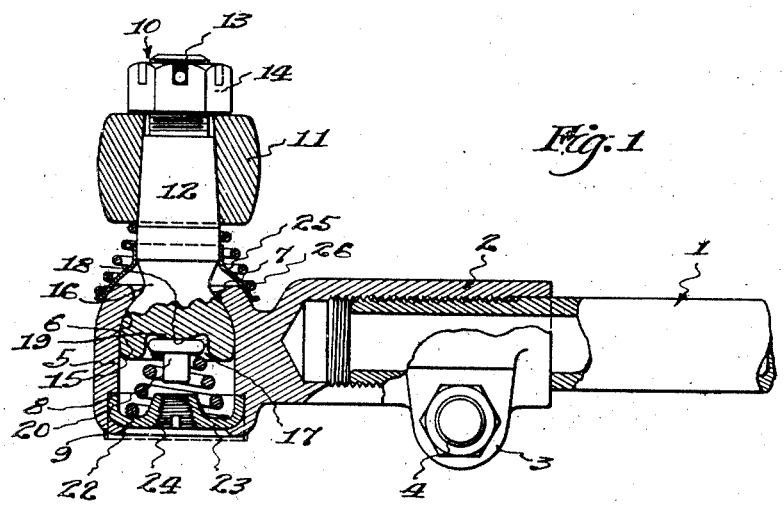
Fig. 1 is a longitudinal vertical sectional view through a tie rod construction embodying the preferred form of my invention.
Figure 2:
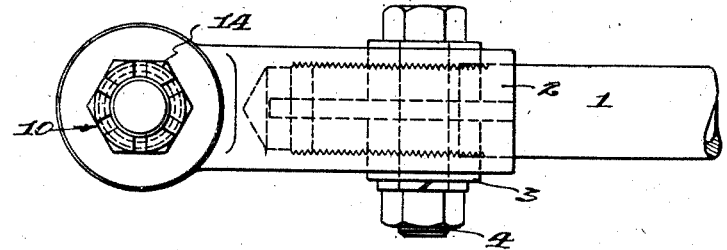
Fig. 2 is a top view of the parts shown in Fig. 1.

Referring now in detail to that embodiment of the invention, illustrated in Figs. 1 and 2 of the drawings, 1 indicates as a whole one end of an automobile tie rod which as shown herein is tubular and is threaded for engagement in one end of a sleeve 2. This sleeve is preferably split along the bottom in the usual manner and is provided upon opposite sides of the split with ears 3 to receive a bolt and associated nut 4 whereby said sleeve is securely fixed upon said tie rod end in the desired adjusted position.

The sleeve 2 is provided at its end with a tubular or hollow boss or housing member 5 arranged with its axis at a right angle to the axis of said sleeve. The top end of said boss or housing member is formed to provide an internal hemi-spherical, downwardly facing bearing surface 6 which communicates with a somewhat constricted opening 7 at the top of said boss. The bottom end of said housing member is formed to provide a downwardly facing annular shoulder 8 and depending below the same is a deformable annular flange 9 as best shown in dotted lines in Fig. 1.

10 indicates as a whole a stud associated with the boss or housing member in a manner operatively connecting the tie rod 1 to an arm 11 or the like of an automobile and which arm generally constitutes the steering knuckle arm. Said stud includes a tapered body 12 fitting the arm 11 and carrying a threaded extension 13 at its top end to receive a nut 14 by which the stud is securely fixed to said arm.

The bottom end of this stud includes a substantially hemi-spherical head 15, connected to the tapered body by a neck 16 of reduced diameter. The head which has a bearing engagement with the internal bearing surface 6 in the boss or housing member is preferably slightly more than a hemisphere and is provided in its bottom with a recess 17. This recess has a convexed or rounded bottom or projection 18 and the center of said projection is coincident with the center of the internal hemi-spheric surface of the head.

This convexed or rounded projection engages upon the flat top of the head 19 of a yieldably supporting member 20. This member is in the form of a stud or button operatively engaged upon the smaller end of a tapering spring 22, the other and larger end of which engages upon a cup shaped closure plate or disc 23 which in turn seats against the shoulder 8 in the boss or housing member.

After the assembly of the parts thus described, the flange 9 is upset inwardly to secure the closure in place. As the hollow boss or housing member is packed with a lubricant for the relatively movable surfaces before mentioned, said disc is upset inward, centrally to receive a removable screw plug 24 by means of which such lubricant may be introduced into said housing member.

To prevent the entrance of dust and the like into the housing member through the opening 7, I provide upon the top end of the tapered body a hemi-spherical dust plate or guard 25 which snugly fits upon the top end of the housing member as shown in Fig. 1. To prevent displacement of this plate or guard, a spring 26 surrounds the tapered body between stud guard and the arm 11.

In the operation of the device, when a force is exerted upon the stud 10 the same will oscillate in the direction of such force and during this movement the rounded projection 18 of the head will rock upon the flat top of the supporting stud head 19. It naturally follows that the friction and wear of the parts 18 and 19 will practically be eliminated.

Figure 3:
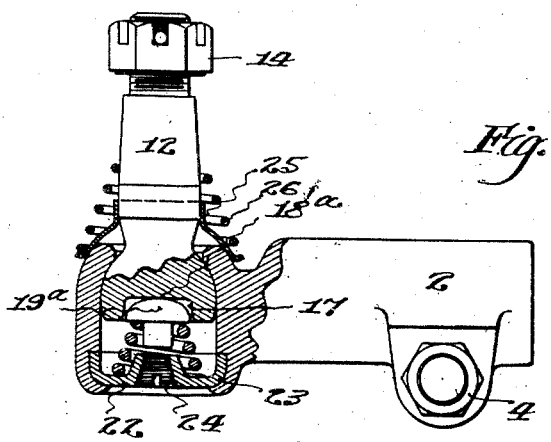
Fig. 3 is a view similar to Fig. 1 and illustrates a slightly modified construction.

In the modification shown in Fig. 3, the stud head 19a is convexed upon its top surface and the bottom 18a of the recess 17 is made flat, the other parts remaining the same and bearing the same reference numeral as before. With such an arrangement, it is apparent that in the oscillating movement of the stud 10, the same rolling bearing engagement is present and which engagement tends to eliminate all friction and wear.

While in describing the invention, I have referred in detail to that embodiment of the invention, illustrated in the drawings, the same is to be considered merely as illustrative so that I do not wish to be limited thereto except as may be specifically set forth in the appended claims.

I claim as my invention:—

1. In a tie rod construction, a housing member having a substantially hemi-spherical inner surface with an aperture therethrough, a stud having a substantially hemi-spherical head conforming in shape to the surface of the housing disposed in said housing and a body passing through said aperture, spring means carrying a substantially flat headed stud disposed in said housing and adapted to press said head into contact with said inner surface and a rounded projection carried by said hemi-spherical head, axially disposed with respect to said stud and adapted to have a rolling contact with said flat head of said stud.

2. In a tie rod construction, a housing member having a substantially hemi-spherical inner surface with an aperture therethrough, a stud having a substantially hemi-spherical head conforming in shape to the surface of the housing disposed in said housing and a body passing through said aperture, spring means carrying a headed stud disposed in said housing and adapted to press said head into contact with said inner surface and a rounded projection carried by said hemi-spherical head, axially disposed with respect to said stud and adapted to have a rolling contact with said head of said stud.

3. In a tie rod construction, a housing member having a substantially hemi-spherical inner surface with an aperture therethrough, a stud having a substantially hemi-spherical head conforming in shape to the surface of the housing disposed in said housing and a body passing through said aperture, spring means carrying a support disposed in said housing and adapted to press said head into contact with said inner surface and a rounded projection carried by said hemi-spherical head, axially disposed with respect to said stud and adapted to have a rolling contact with said support.

4. In a tie rod construction, a housing member having a substantially hemi-spherical inner surface with an aperture therethrough, a stud having a substantially hemi-spherical head conforming in shape to the surface of the housing disposed in said housing and a body passing through said aperture, means carrying a substantially flat headed stud disposed in said housing and adapted to press said head into contact with said inner surface and a rounded projection carried by said hemi-spherical head, axially disposed with respect to said stud and adapted to have a rolling contact with said head of said stud.

5. In a tie rod construction, a housing member having a concave annular wall surrounding an aperture, a stud member having a shank extending through said aperture and a substantially hemi-spherical head conforming to said concave annular wall, said stud having a recess the bottom wall of which lies in substantially the plane of a great circle of said head, a supporting member in said housing adapted to engage the bottom wall of said recess, a cover for said housing, and resilient means supported by said cover and engaging said supporting member to maintain said supporting member in engagement with said stud head.

In testimony whereof, I have hereunto set my hand, this 4th day of August, 1931.

ERLE K. BAKER.